United States Patent
Amundson

(10) Patent No.: US 10,054,304 B2
(45) Date of Patent: Aug. 21, 2018

(54) TRIM PRODUCT AND METHODS OF MANUFACTURING

(71) Applicant: Gregory A. Amundson, Scandia, MN (US)

(72) Inventor: Gregory A. Amundson, Scandia, MN (US)

(*) Notice: Subject to any disclaimer, the term of this patent is extended or adjusted under 35 U.S.C. 154(b) by 0 days.

(21) Appl. No.: 15/701,906

(22) Filed: Sep. 12, 2017

(65) Prior Publication Data

US 2018/0003375 A1 Jan. 4, 2018

Related U.S. Application Data

(63) Continuation of application No. 14/983,979, filed on Dec. 30, 2015, now Pat. No. 9,765,960.
(Continued)

(51) Int. Cl.
*E04F 19/04* (2006.01)
*F21V 33/00* (2006.01)
(Continued)

(52) U.S. Cl.
CPC .......... *F21V 33/006* (2013.01); *E04F 19/02* (2013.01); *E04F 19/061* (2013.01); *G02B 6/0005* (2013.01); *E04F 19/022* (2013.01); *E04F 19/045* (2013.01); *E04F 19/0459* (2013.01); *E04F 2019/0404* (2013.01); *E04F 2019/044* (2013.01); *E04F 2019/0427* (2013.01); *E04F 2019/0454* (2013.01); *F21Y 2115/10* (2016.08); *H01B 7/40* (2013.01); *H02G 3/04* (2013.01); *H02G 3/045* (2013.01); *H02G 3/0406* (2013.01); *H02G 3/0487* (2013.01); *H02G 3/26* (2013.01); *H02G 3/263* (2013.01); *Y10T 428/13* (2015.01); *Y10T 428/139* (2015.01); *Y10T 428/24314* (2015.01); *Y10T 428/24479* (2015.01);
(Continued)

(58) Field of Classification Search
None
See application file for complete search history.

(56) References Cited

U.S. PATENT DOCUMENTS 2,303,864 A 12/1942 Reason
2,831,049 A 4/1958 Cabral
(Continued)

FOREIGN PATENT DOCUMENTS

CN 201787064 U 4/2011
DE 2501580 A 7/1976
(Continued)

OTHER PUBLICATIONS

Magic American ½ in. × 16 Ft. Counter Trim (CT306T) from the HomeDepot, 3 pages Jan. 11, 2012.
(Continued)

*Primary Examiner* — Jeffrey A Vonch
(74) *Attorney, Agent, or Firm* — Patterson Thuente Pedersen, P.A.

(57) ABSTRACT

A flexible inside corner trim piece is formed with concave depressions at hinge portions where wings attach to the body. The trim piece can be formed such that wings and a top cap lay flat in plane perpendicular to body or wings and top cap curve at an angle. Hinge portions can be narrow or wide and symmetrical or asymmetrical. The trim piece can be dyed, paintable, or present another decorative surface. The trim piece can include embedded lighting.

20 Claims, 8 Drawing Sheets

Related U.S. Application Data

(60) Provisional application No. 62/212,230, filed on Aug. 31, 2015.

(51) Int. Cl.
  E04F 19/06 (2006.01)
  F21V 8/00 (2006.01)
  E04F 19/02 (2006.01)
  F21Y 115/10 (2016.01)
  H01B 7/40 (2006.01)
  H02G 3/04 (2006.01)
  H02G 3/00 (2006.01)

(52) U.S. Cl.
  CPC .................. *Y10T 428/24488* (2015.01); *Y10T 428/24744* (2015.01)

(56) References Cited

U.S. PATENT DOCUMENTS

| | | |
|---|---|---|
| 3,029,303 A | 4/1962 | Severino |
| 3,200,547 A | 8/1965 | Johnson |
| 3,216,164 A | 11/1965 | Stillman |
| 4,246,303 A | 1/1981 | Townsend |
| 4,404,425 A | 9/1983 | Rich |
| 4,530,865 A | 7/1985 | Sprenger |
| 4,629,648 A | 12/1986 | Minick |
| 4,644,099 A | 2/1987 | Basconi |
| 4,670,959 A | 6/1987 | Rosen |
| 4,796,348 A | 1/1989 | Rosen |
| 4,801,764 A | 1/1989 | Ohlhaber |
| 4,829,730 A | 5/1989 | Zeilinger |
| 5,526,619 A | 6/1996 | Vadeges |
| 5,730,446 A | 3/1998 | Taylor |
| 5,810,406 A | 9/1998 | Reid, Jr. et al. |
| 6,259,843 B1 | 7/2001 | Kondo |
| 6,332,479 B1 | 12/2001 | Ko |
| 6,476,323 B2 | 11/2002 | Beebe et al. |
| 7,118,791 B2 | 10/2006 | Martel |
| 2003/0175482 A1 | 9/2003 | Porter |
| 2004/0087739 A1 | 5/2004 | Onder |
| 2007/0138349 A1 | 6/2007 | Ayoub |
| 2008/0125532 A1 | 5/2008 | Nelson |
| 2008/0149362 A1 | 6/2008 | Ruddick |
| 2009/0294016 A1 | 12/2009 | Sayres et al. |
| 2011/0020580 A1 | 1/2011 | Amundson |
| 2013/0052424 A1 | 2/2013 | Amundson |
| 2013/0196113 A1 | 8/2013 | Amundson |
| 2013/0266760 A1 | 10/2013 | Amundson |
| 2014/0093689 A1 | 4/2014 | Amundson |

FOREIGN PATENT DOCUMENTS

| | | |
|---|---|---|
| DE | 10 2007 015 894 A1 | 10/2008 |
| EP | 0134455 A1 | 3/1985 |
| EP | 1516971 A2 | 3/2005 |
| EP | 1700971 A2 | 9/2006 |
| EP | 2082674 A1 | 7/2009 |
| EP | 2671489 A2 | 12/2013 |
| FR | 2565023 A1 | 11/1985 |
| FR | 2568730 | 2/1986 |
| GB | 2022670 A | 12/1979 |
| GB | 2182984 A | 5/1987 |
| GB | 2301153 A | 11/1996 |
| GB | 2337565 A | 11/1999 |
| GB | 2352867 A | 2/2001 |
| GB | 2444089 A | 5/2008 |
| JP | 2006-121881 | 5/2006 |
| WO | WO 2015/075220 A1 | 5/2015 |

OTHER PUBLICATIONS

Reimer et al, Bio-sense or Nonsense, Aug. 2008, 4 pages.
Machine translation of CN 201787064, Jul. 24, 2014.
Machine translation of DE 10 2007 015 894, Sep. 16, 2015.
Machine translation of FR 2 568 730, Sep. 16, 2015.
Machine translation of JP 2006121881, May 2006.
Application and File History for U.S. Appl. No. 13/632,447, filed Oct. 1, 2012. Inventor: Gregory A. Amundson.
Application and File History for U.S. Appl. No. 13/872,823, filed Apr. 29, 2013. Inventor: Gregory A. Amundson.
Application and File History for U.S. Appl. No. 14/983,979, filed Dec. 30, 2015. Inventor: Gregory A. Amundson.

TRIM PRODUCT AND METHODS OF MANUFACTURING

CROSS-REFERENCE TO RELATED APPLICATIONS

This application is a continuation of application Ser. No. 14/983,979, filed Dec. 30, 2015, entitled "Inside Corner Trim Product, which claims the benefit of U.S. Provisional Application No. 62/212,230, filed Aug. 31, 2015, entitled "Inside Corner Trim Product, each of which is hereby fully incorporated herein by reference.

TECHNICAL FIELD

The present invention generally relates to building products, and more particularly to flexible corner trim material for application to inside corners for decorative and cosmetic applications.

BACKGROUND

In construction of dwellings and other buildings, inside corners are finished in a variety of ways. Depending on the wall material, inside corners may be created by abutting finishing materials. This can be sufficient in many cases if the structural materials at the corner are perfectly plumb and straight. However, many building materials and construction techniques are less than perfect. More commonly corners are not plumb and straight and further finishing is required or desirable. In the case of drywall construction, sheets of drywall are abutted at the inside corners and the joints are sealed with tape which is then concealed with drywall joint compound. When paneling is used cove molding may be applied at the inside corners to conceal the joints. However, these approaches are time consuming and may still not provide a desired appearance at the inside corners because of unevenness of the resulting walls.

Cove molding is made from relatively rigid materials and does not readily conform to wall surfaces that are less than regular. Drywall taping requires considerable skill and practice to achieve a pleasing appearance.

SUMMARY

The invention solves many of the above discussed problems and presents a useful alternative way to finish inside corners. Corners finished with embodiments of the invention tend to soften the appearance of the room, provide a smoother transition between walls and be more cosmetically pleasing than corners finished by other techniques.

In example embodiments, an inside corner trim piece can unitary in structure. An inside corner trim piece extruded or molded of a flexible material and can include a body and wings. Each wing is connected to the body at a hinge portion. The hinge portion between the wings and the body can present a longitudinal concave depression allowing for greater flexibility of the wings and better conformance to irregularities in materials at a corner.

In an example embodiment, the longitudinal concave depression at the hinge portion can have a wider or narrower extent as compared to and may feature an approximately semicircular cross section or a cross section having an arcuate shape. The longitudinal depression may also have an angular shape. The longitudinal concave depression of the hinge portion may have a radius of curvature that is about 10/7 or approximately alternately from about 1.4 to about 6 times as great as the thickness of the material of the hinge portion. For example, if the thinnest area of the hinge portion is about 0.007 inches thick the radius of curvature of the concave depression, viewed in cross section may range from about 0.010 inches to about 0.060 inches. "About" in this context means with a tolerance of plus or minus 0.005 inches.

In example embodiments, when viewed in cross section the wings and top of the body lay flat when the corner trim piece is in a relaxed state and not applied to an inside corner. According to another example embodiment, the wings and top of the body define a concave arc or curve such that wings are angled away from a plane perpendicular to a line that bisects the body into mirror images when viewed in cross section.

According to another example embodiment, the trim piece can be dyed, paintable, can be prepainted or present a wood trim appearance. In another example embodiment, the trim piece can present or include embedded lighting, for example, in the form of light emitting diodes. According to another example embodiment, the trim piece includes fiber optics related to the embedded lighting and/or low voltage wiring to support the wiring.

According to another example embodiment, the trim piece can present a lengthwise slit to provide access to a lengthwise passage or cavity in the trim piece. The passage or cavity may have a circular, oval, elliptical or other shaped cross section.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
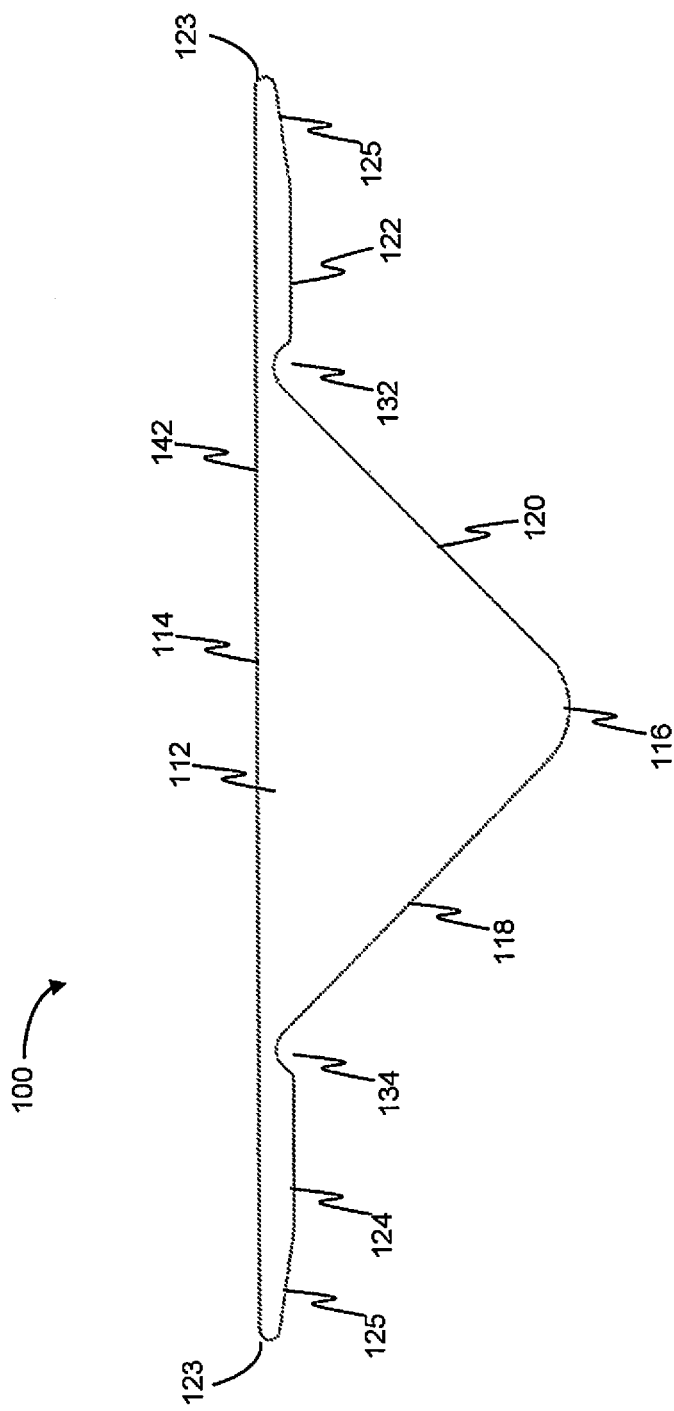
FIG. 1 is a cross-sectional view of a trim piece according to an example embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1 an example embodiment of the invention is depicted. FIG. 1 depicts a cross-sectional view of a trim piece 100. Trim piece 100 is of indeterminate length and can be extruded to any desired length. As depicted, trim piece 100 is a unitary structure formed of a flexible substance such as a polymer. Example polymers that can be used are disclosed in U.S. Patent Application 2013/0266760 A1 which is incorporated by reference herein.

When viewed in cross-section, trim piece 100 according to an example embodiment generally presents body 112, top cap 114, junction 116, first side 118, second side 120, and wings 122 and 124.

Body 112 has a generally triangular cross section with a rounded corner at junction 116. According to an example embodiment, junction 116 presents a radius of curvature of about 0.030 inches.

First side 118 and second side 120 are generally mirror images of each other and may include or be adapted to receive an adhesive (not shown) thereon to facilitate attachment of trim piece 100 to an inside corner.

Wings 120 and 122, when viewed in cross section, extend outwardly away from body 112 in opposing directions. Wings 120 and 122 are generally mirror images of one another and further present rounded tip 123 and tapered portion 125.

Trim piece 100, when viewed in cross-section, can span a width of 0.5 to three inches between the tip of wing 122 and wing 124. Trim piece 100 can span other widths as desired for a particular finishing circumstance.

In the depicted embodiment, in FIGS. 1-6, first side 118 and second side 120 form an approximately 90 degree angle at junction 116. In other example embodiments, this angle can be more obtuse or more acute to facilitate use in environments where walls do not meet at 90 degree angles. Junction 116 can present a sharp corner or be rounded when viewed in cross section.

Wings 122 and 124 are arranged at opposite sides of body 112, and extend outwardly away from body 112 and can taper to terminate at narrow or a substantially knife edges. Wings 122 and 124 can taper along their entire span or over only a portion. Wings 122 and 124 are connected to body 112 at hinge portions 132, 134. When viewed in cross-section, hinge portions 132 and 134 can present approximately semi-circular, arcuate or curved concave indentations in body 112 on a side opposite top cap 114. The indentations of hinge portions 132 and 134 can have alternative shapes such as rectangular or triangular, and can be arranged on the same side of body 112 as top cap 114 as well as on the opposite side as depicted. Hinge portions 132 and 134 are bordered by a trough shaped depression that can have a radius of curvature of 0.01 inches or be larger or smaller as desired.

In the example embodiments depicted in FIGS. 1-4, hinge portions 132 and 134 are relatively narrow and non-symmetrical as extensions of sides 118 and 120. In the example embodiment depicted in FIGS. 5-6, hinge portions 132 and 134 are relatively wide and symmetrical. Width and symmetricality may vary independent of each other as well.

Figure 2:
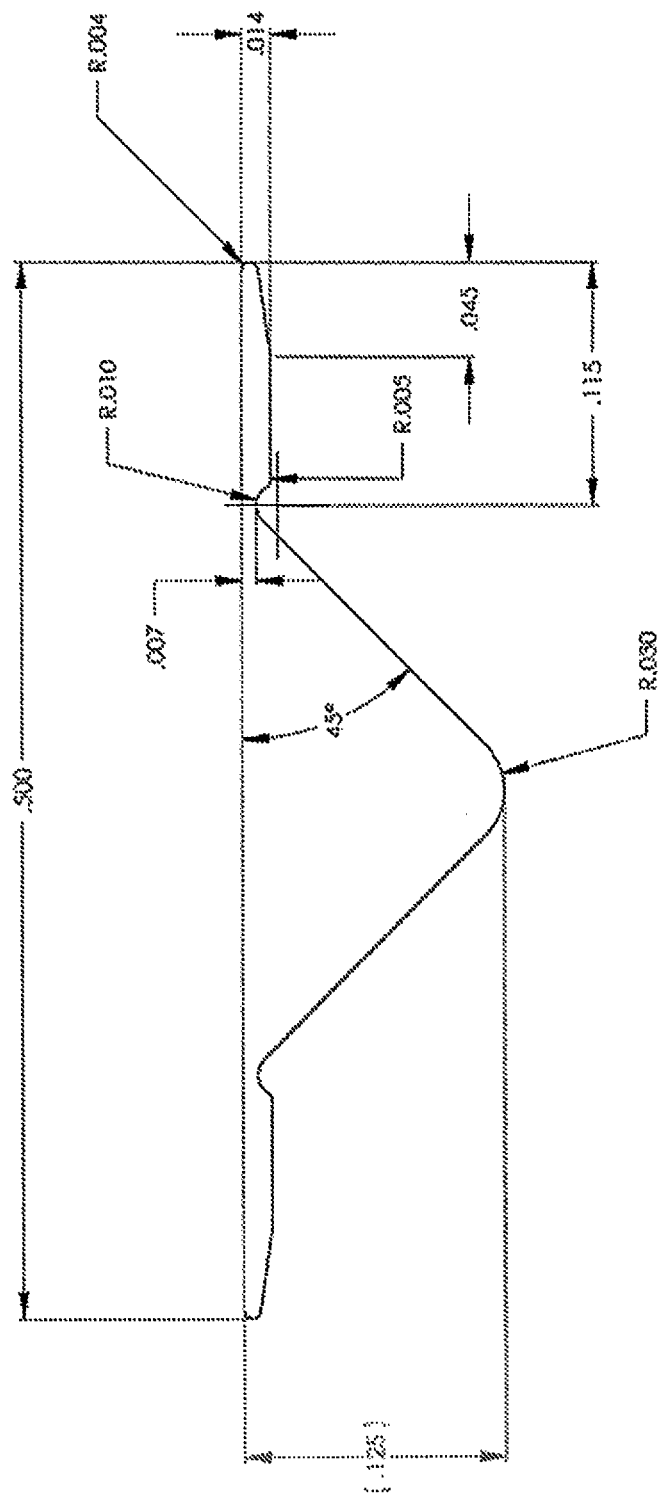
FIG. 2 is a cross-sectional view of a trim piece according to the embodiment of FIG. 1 including example dimensions in inches and degrees.
Figure 3:
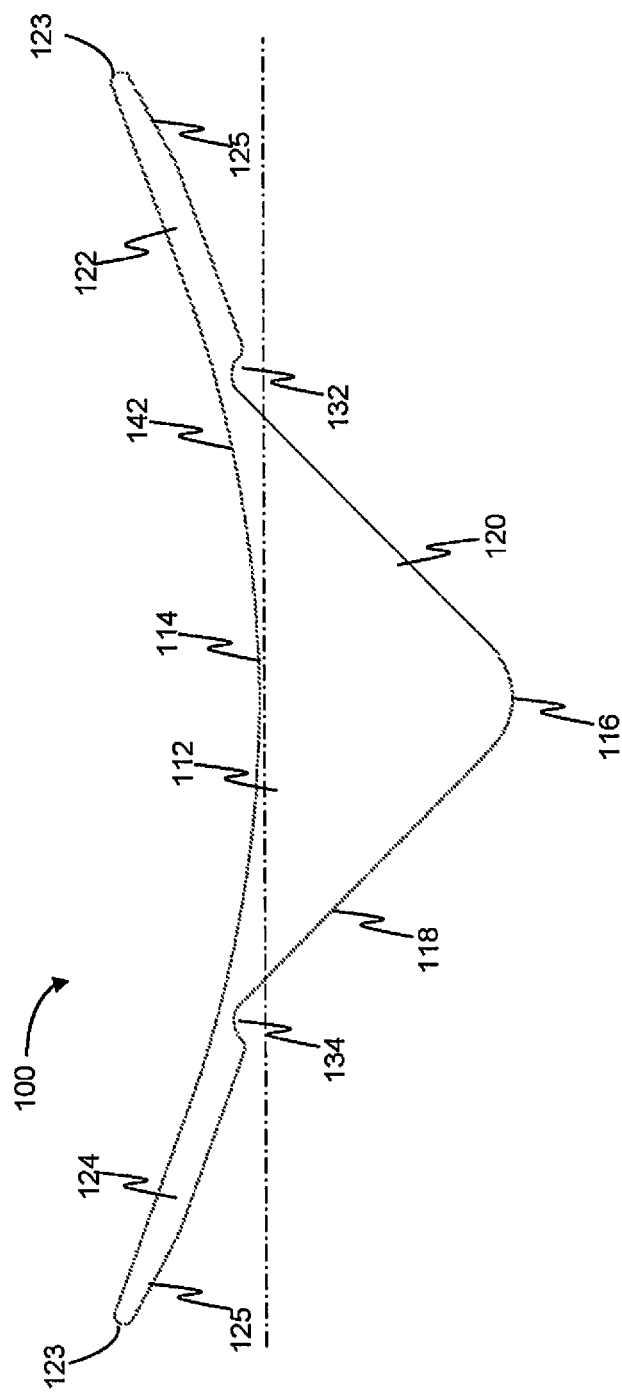
FIG. 3 is a cross-sectional view of a trim piece according to another example embodiment of the invention.
Figure 4:
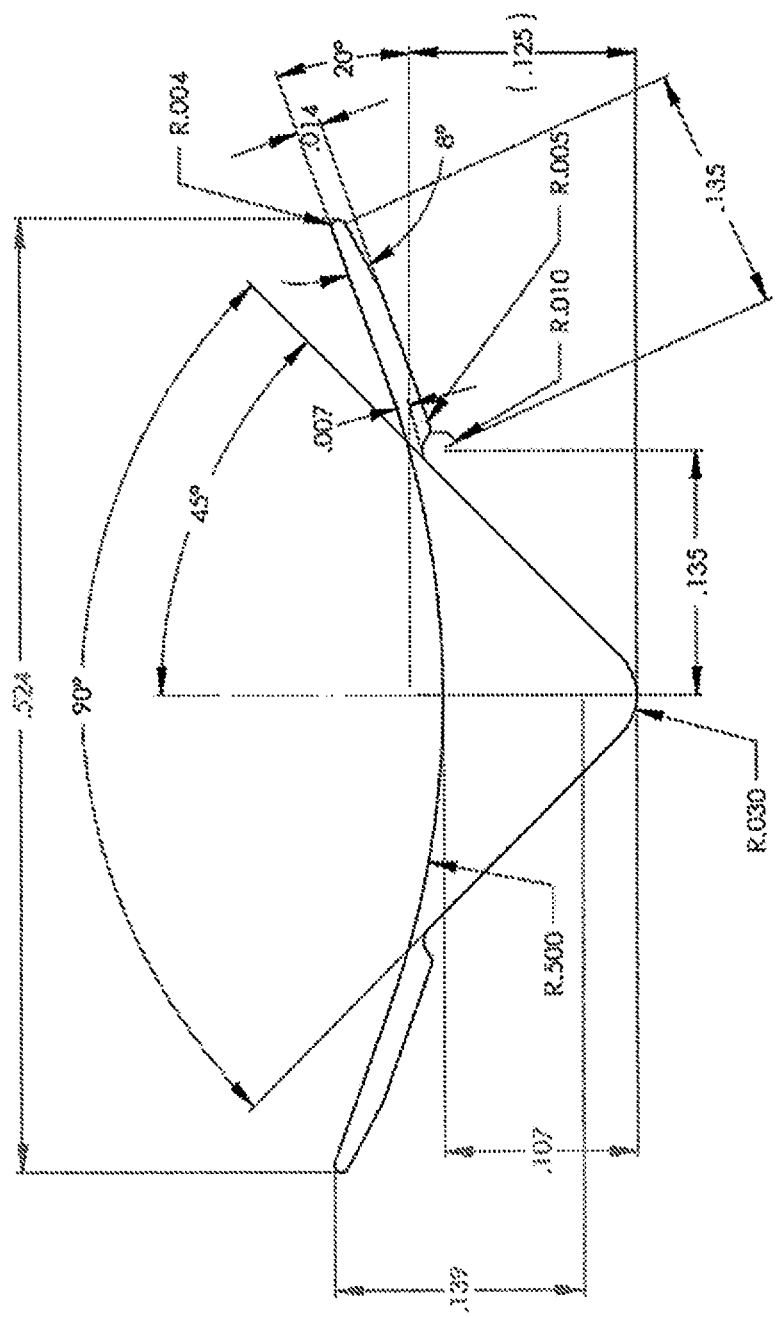
FIG. 4 is a cross-sectional view of a trim piece according to the embodiment of FIG. 3 including example dimensions in inches and degrees.
Figure 5:
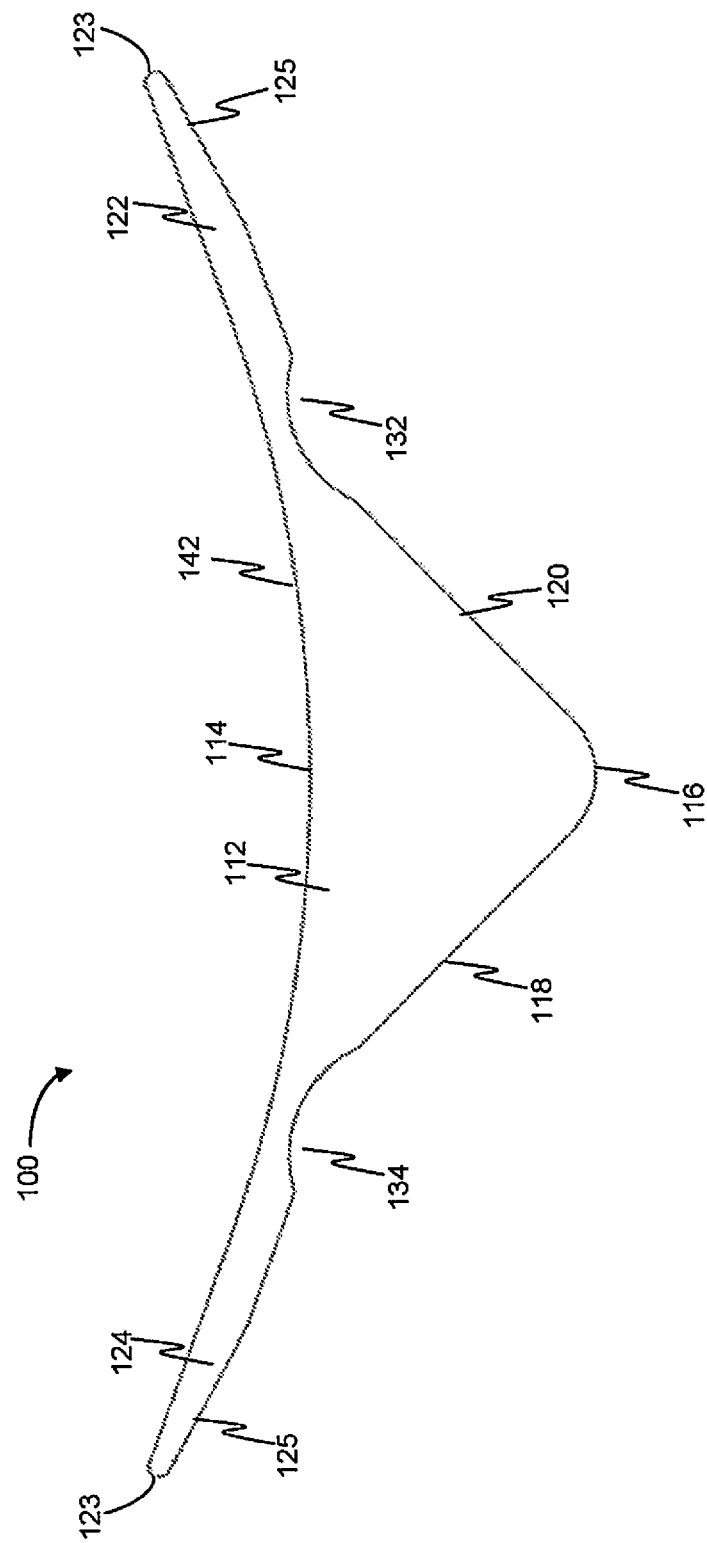
FIG. 5 is a cross-sectional view of a trim piece according to another example embodiment of the invention.
Figure 6:
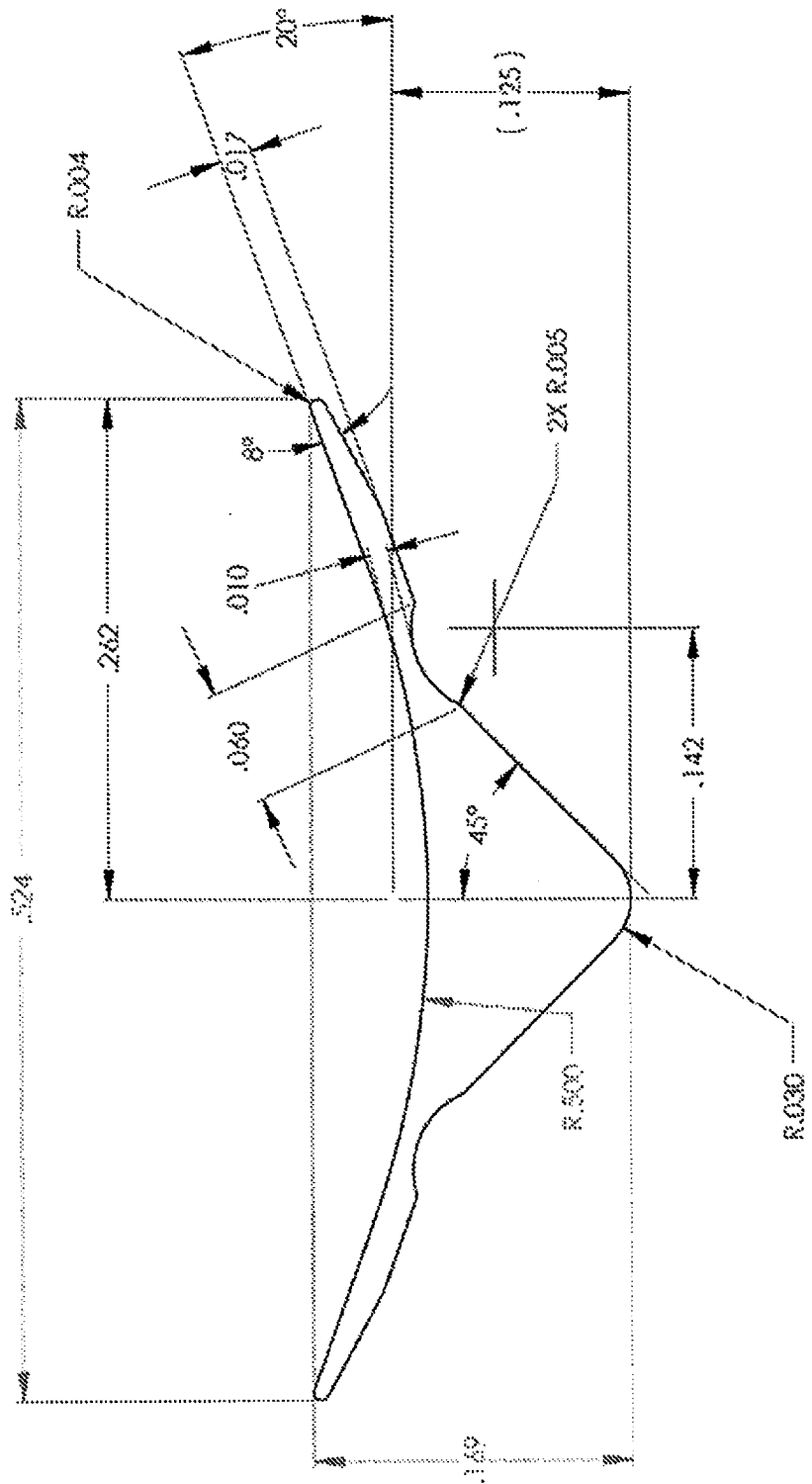
FIG. 6 is a cross-sectional view of a trim piece according to the embodiment of FIG. 5 including example dimensions in inches and degrees.

In the example embodiment depicted in FIGS. 1 and 2, top cap 114 and wings 122 and 124 lie substantially on a plane that is perpendicular to a line bisecting body 112 at junction 116. In other embodiments, such as those depicted in FIGS. 3-6, top cap 114 is curved or arcuate and wings 122 and 124 can lie at an angle of twenty degrees plus or minus ten degrees from the plane that is perpendicular to a line bisecting body 112 at junction 116.

Figure 7:
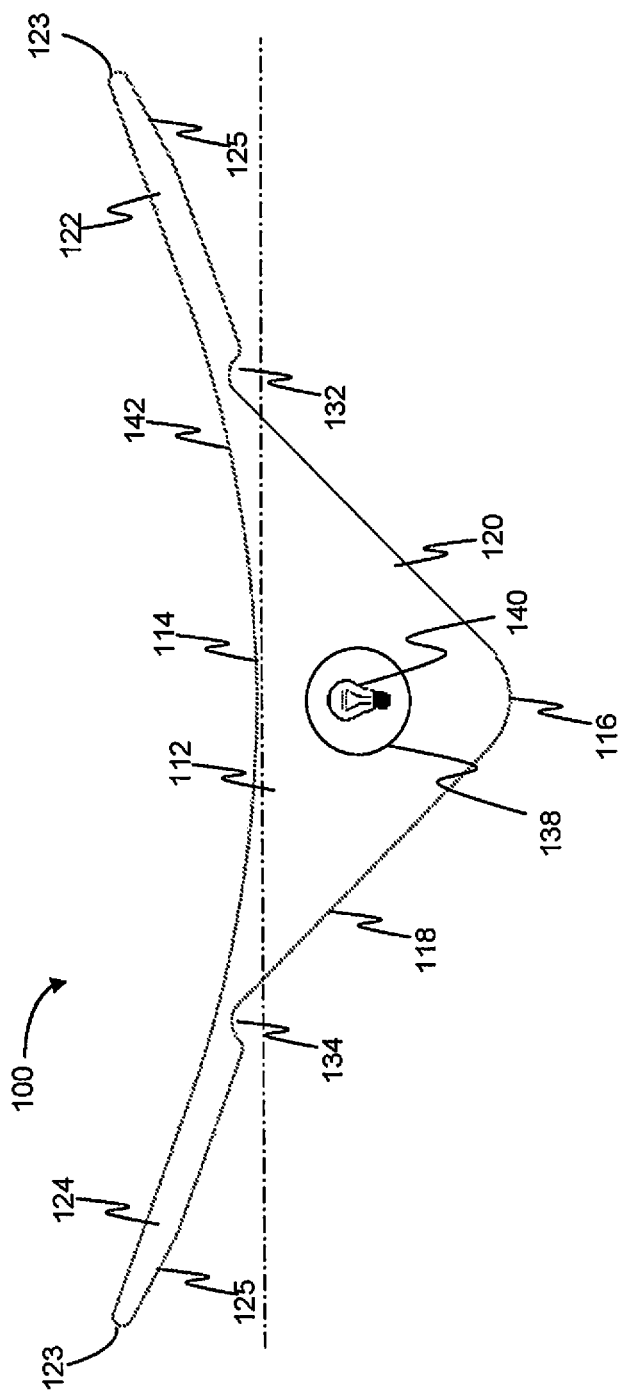
FIG. 7 is a cross-sectional view of a trim piece including illumination according to another example embodiment of the invention and FIG. 8 is a cross-sectional view of a trim piece including a slit access to an internal cavity.

Referring to FIG. 7, trim piece 100 can include illumination 138, for example, LEDs 140. The LEDs can be incorporated into trim piece 100 during the extrusion process, or applied to top cap 114 or embedded after extrusion. Trim piece 100 can present wiring or connectors (not shown) as needed to supply power to any included lights. Trim piece 100 can also include fiber optic therein to transmit light to other locations within trim piece 100.

Trim piece 100 can be composed of a single multiple density extruded PVC, TPO, bio-based polymer, EcoFlex, Elvax, or similar product having sufficient rigidity and flexibility to form trim piece 100.

Trim piece 100 can present a decorative surface 142 that causes trim piece 100 to match or contrast with the surfaces abutting the corner to which it is mated. The decorative surface 142 can be present on the outside of body 112 or top cap 114, or color or texture can be integrated throughout trim piece 100, for example, by forming trim piece 100 of pigmented materials. The decorative surface 142 can be paintable, colored to match desired paint colors, wood trim, metallic, or other desired surface. Trim piece 100 can present adhesive on first side 118 and second side 120 opposite top cap 114.

Figure 8:
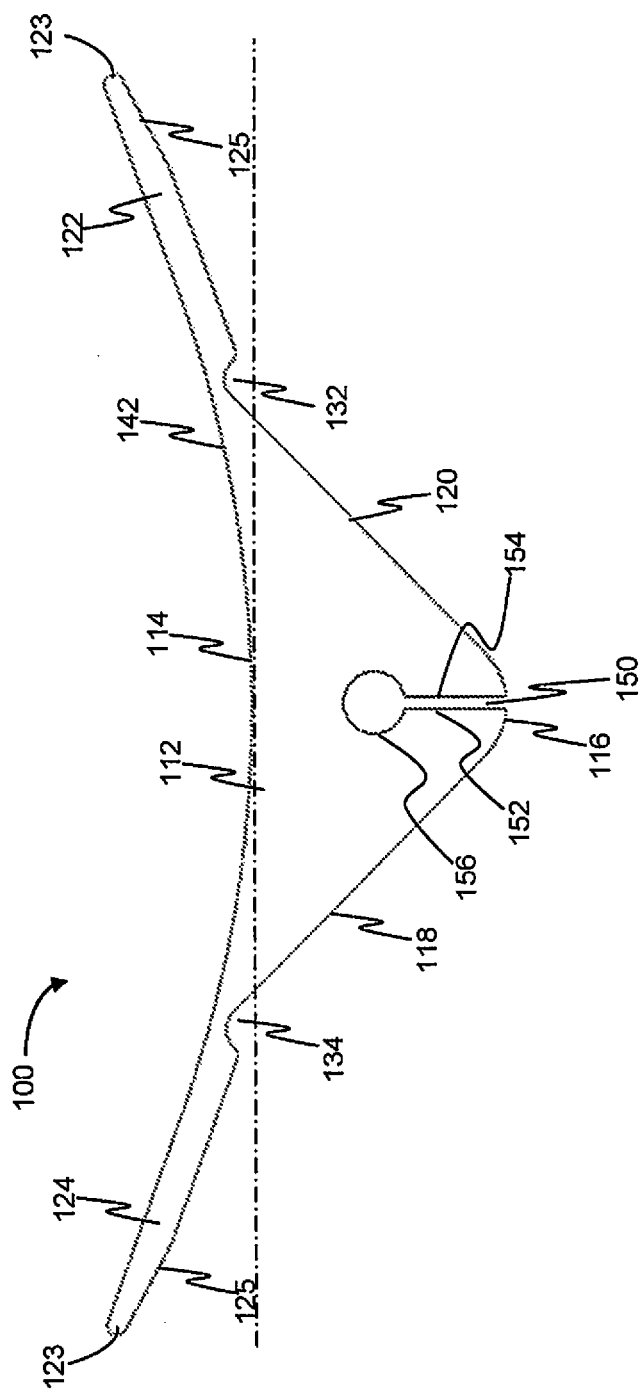

Referring to FIG. 8 another embodiment of trim piece 100 is depicted. Slit 150 is formed in body 112 of trim piece 100. Slit 150 is defined by left side 152, right side 154 and aperture 156. Aperture 156 is configured to accept insertion of, for example, a fiber or wire into aperture 156 to generally conceal the fiber or wire from view. Aperture 156 may accommodate one or more lengths of fiber or wire while remaining within the scope of the invention. In addition, the cross sectional profile of aperture 156 is circular in FIG. 8. However, the cross-sectional profile of aperture 156 may be square, rectangular, triangular, oval, elliptical, race track shaped or the shape of other regular or irregular polygons while remaining within the scope of the invention. Left side 152 and right side 154 of slit 150 can meet in close apposition or maintain a small gap therebetween. Slit 150 may be located proximate junction 116 or at another location on trim piece 100. Slit 150 may be located to be accessed from any location on the cross section of trim piece but a location proximate junction 116 conceals the location of slit 150 when trim piece is applied.

In operation, trim piece 100 is fitted into a corner between two walls, a wall and a floor, a wall and a cabinet, or other location where two substantially planar surfaces meet. Trim piece 100 can be oriented such that junction 116 rests proximate or against an inside corner and top cap 114 faces outwards. Hinge portions 132 and 134 enable increased flexibility of wing portions 122 and 124, thus enabling wing portions 122 124 to lay flat against each generally planar surface and to compensate for irregularities of the surfaces thus presenting a smooth and finished appearance to the inside corners with less effort than more conventional finishing techniques. Trim piece 100 can be held in place by an integrated adhesive, or by a user applied adhesive.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of making a trim piece, comprising:
forming an indeterminate length of unitary structure from a flexible material, such that the unitary structure when viewed in cross section, includes:
a body having an inwardly extending portion presenting a first side surface and a second side surface and comprising two outside portions including a first outside portion and a second outside portion;
a first wing portion extending outwardly away from the first outside portion;
a second wing portion extending outwardly away from the second outside portion;
a first hinge portion between the first wing portion and the first outside portion, having a first cross section relatively thinner than the adjacent first wing portion and first outside portion, bounded by a surface having a radius of curvature that is 1.40 to 6 times a minimum thickness of the first hinge portion; and
a second hinge portion between the second wing portion and the second outside portion, having a second cross section relatively thinner than the adjacent second wing portion and second outside portion, bounded by a surface having a radius of curvature that is 1.40 to 6 times a minimum thickness of the second hinge portion.

2. The method as claimed in claim 1, further comprising forming the indeterminate length of unitary structure by extrusion.

3. The method as claimed in claim 1, further comprising forming the indeterminate length of unitary structure by molding.

4. The method as claimed in claim 1, further comprising forming at least one of the first hinge portion and the second hinge portion such that the radius of curvature ranges from about 0.010 inches to about 0.060 inches.

5. The method as claimed in claim 1, further comprising forming at least one of the first hinge portion and the second hinge portion such that the minimum thickness of at least one of the first hinge portion and the second hinge portion is in a range from 0.007 inches to 0.010 inches.

6. The method as claimed in claim 1, further comprising forming the unitary structure to present a lengthwise slit and a lengthwise passage or cavity in the trim piece.

7. The method as claimed in claim 6, further comprising forming the unitary structure such that the lengthwise passage or cavity has a cross sectional shape selected from a group consisting of square, rectangular, triangular, racetrack-shaped, circular, oval and elliptical.

8. The method as claimed in claim 1, further comprising embedding lighting structures in the indeterminate length of the unitary structure.

9. The method as claimed in claim 1, further comprising forming the indeterminate length of unitary structure from a material selected from a group consisting of single density PVC, multi-pole density PVC, TPO, bio-based polymer, EcoFlex or Elvax.

10. A method of trimming, comprising:
applying an indeterminate length of a flexible unitary structure to the inside corner; selecting the indeterminate length of the unitary structure, such that the unitary structure when viewed in cross section, includes:
a body having an inwardly extending portion presenting a first side surface and a second side surface and comprising two outside portions including a first outside portion and a second outside portion;
a first wing portion extending outwardly away from the first outside portion;
a second wing portion extending outwardly away from the second outside portion;
a first hinge portion between the first wing portion and the first outside portion, having a first cross section relatively thinner than the adjacent first wing portion and first outside portion, bounded by a surface having a radius of curvature that is 1.40 to 6 times a minimum thickness of the first hinge portion;
a second hinge portion between the second wing portion and the second outside portion, having a second cross section relatively thinner than the adjacent second wing portion and second outside portion, bounded by a surface having a radius of curvature that is 1.40 to 6 times a minimum thickness of the second hinge portion; and bonding the indeterminate length of the unitary structure to an inside corner with an adhesive.

11. The method as claimed in claim 10, further comprising bonding the indeterminate length of the unitary structure to the inside corner with an integrated adhesive.

12. The method as claimed in claim 10, further comprising applying a user applied adhesive to the indeterminate length of the unitary structure.

13. The method as claimed in claim 10, further comprising selecting the indeterminate length of the unitary structure to include integral lighting.

14. The method as claimed in claim 10, further comprising selecting the indeterminate length of the unitary structure to include a lengthwise slit and a lengthwise passage or cavity therein.

15. The method as claimed in claim 14, further comprising inserting an elongate structure into the lengthwise passage or cavity via the lengthwise slit.

16. The method as claimed in claim 15, further comprising selecting the elongate structure to include a wire or fiber optic.

17. The method as claimed in claim 10, further comprising applying force to the indeterminate length of the unitary structure to deform at least one of the first hinge portion and the second hinge portion by contact with the inside corner.

18. A trim piece for finishing inside corners, comprising:
an elongated unitary structure of indeterminate length which when viewed in cross section, includes;
a central body;
the body further presenting two outside portions including a first outside portion and a second outside portion;
a first wing portion extending outwardly away from the first outside portion;
a second wing portion extending outwardly away from the second outside portion;
a first hinge portion between the first wing portion and the first outside portion having a first cross section relatively thinner than the adjacent first wing portion and first outside portion; and
a second hinge portion between the second wing portion and the second outside portion having a second cross section relatively thinner than the adjacent second wing portion and second outside portion
wherein the first hinge portion and the second hinge portion are bounded by a surface having a radius of curvature that is 1.40 to 6 times a minimum thickness of the first hinge portion and the second hinge portion.

19. The trim piece as claimed in claim 18, wherein for at least one of the first hinge portion and the second hinge portion the radius of curvature ranges from about 0.010 inches to about 0.060 inches.

20. The trim piece as claimed in claim 18, wherein the minimum thickness of at least one of the first hinge portion and the second hinge portion is in a range from 0.007 inches to 0.010 inches.

* * * * *